UNITED STATES PATENT OFFICE.

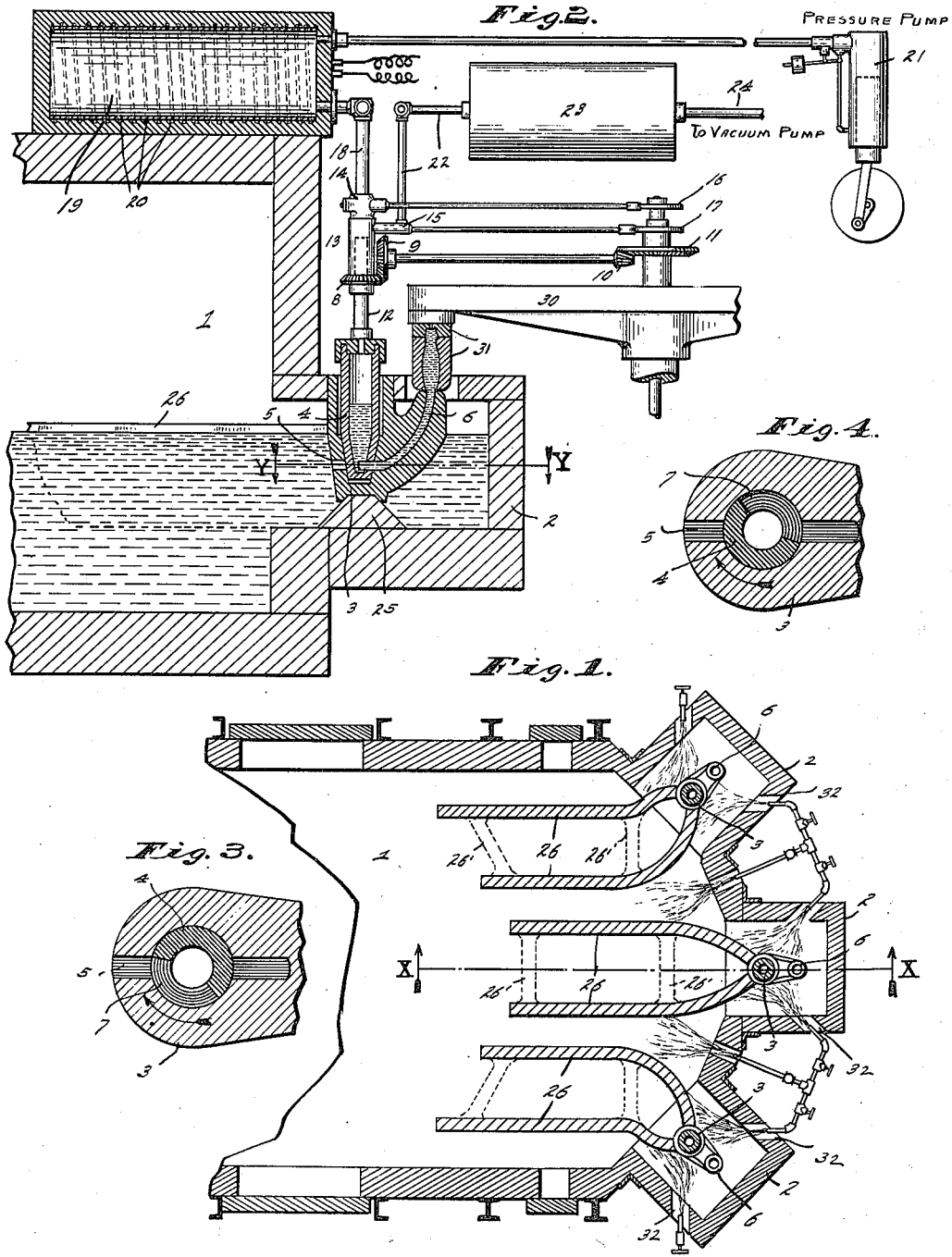

FRANK L. O. WADSWORTH, OF PITTSBURGH, PENNSYLVANIA, ASSIGNOR TO BALL BROTHERS GLASS MANUFACTURING COMPANY, OF MUNCIE, INDIANA, A CORPORATION OF INDIANA.

GLASS-WORKING.

1,275,178.   Specification of Letters Patent.   Patented Aug. 6, 1918.

Application filed July 31, 1914. Serial No. 854,225.

*To all whom it may concern:*

Be it known that I, FRANK L. O. WADSWORTH, a citizen of the United States, residing at Pittsburgh, in the county of Allegheny and State of Pennsylvania, have invented a new and useful Improvement in Glass-Working, of which the following is a specification.

My invention relates to improvements in the method and apparatus illustrated and described in Patent No. 984,974 of September 21, 1911, to H. Severin, in which given measured quantities of molten glass are drawn from a dominant pool into an intermediate receptacle and then discharged into a series of molds, a portion of each charge so delivered being allowed to "overflow" and return to the dominant pool. The principal objects of my invention are, first, to very sensibly increase the speed with which operations of this character can be carried on; second, to simplify the mechanisms which are involved in the practice of these operations; and, third, to eliminate the difficulties which result from mixing portions of the "overflow" glass with the fresh and virgin glass which is supplied to the intermediate receptacle from the dominant pool.

In the drawings, which form part of this specification, Figure 1 is a plan view—in section—of a glass melting tank provided with three intermediate receptacles for the delivery of glass to a series of molds; Fig. 2 is a vertical section on the line X—X of Fig. 1 showing the interior construction of one of the intermediate delivery receptacles, and the means by which it is manipulated; and Figs. 3 and 4 are enlarged plan sections on the line Y—Y of Fig. 2.

In the above figures, 1 indicates a glass melting tank which is charged and fired in the usual manner, and 2, 2, 2 indicate "dog house" extensions built out from the front of this tank and arranged to receive the intermediate delivery chambers or receptacles 3, 3, 3. Each of these delivery receptacles is similar in its general form and construction to those shown in Fig. 3 of the Severin Patent No. 984,974, being composed of a hollow block of clay or of similar refractory material in which is mounted a rotary cylinder 4. Each receptacle 3 is provided with an inlet port 5 and an outlet or discharge port 6, and the lower end of the cylinder 4 is provided with a long port 7 which, by the rotation of the cylinder, can be brought alternately in registry either with the inlet port 5, as shown in Fig. 3, or with the outlet port 6, as shown in Fig. 4. The cylinder 4 is continuously rotated in the direction of the arrow—Figs. 3 and 4—by suitable gears 8, 9, 10 and 11, the latter being mounted on the main driving shaft of the glass forming machine which carries the molds. The interior of the cylinder 4 is in communication through the hollow pipe 12 with the stationary sleeve 13 which is provided with two plunger valves 14 and 15, the stems of which are actuated by cams 16 and 17 on the main driving shaft of the machine. The valve 14 is in communication through the pipe 18 with the interior of a reservoir 19, which is lined with firebrick or other refractory material and contains compressed air that is maintained at a high temperature by the electrical heating coil 20 or by other suitable means. The cylinder 19 is supplied with compressed air by means of a plunger pump 21 which is provided with any suitable form of automatic control mechanism by which the pressure of air in the cylinder 19 can be maintained constant.

The valve 15 communicates through a pipe 22 with a large reservoir 23 that is in communication through a pipe 24 with a suitable form of vacuum pump by means of which any desired degree of exhaustion can be maintained in the said reservoir.

Each of the intermediate receptacles 3 is preferably supported in proper position in the chamber 2 by being seated on a block 25 on the floor of said chamber; and each of these receptacles is provided with a hollow "floater" or guard 26, the front ends of which are shaped to engage the walls of the receptacle 3 on each side of the inlet port 5. These "floaters" or guards are preferably made of a depth substantially equal to that of the chambers 2 and are so shaped that they will float in the molten glass with their upper edges just above the surface (see Fig. 2). The side walls of said "floaters" may be bound together by cross bars 26' or they may be made separate and held in proper position in the tank in the same manner in which ordinary "floaters" are held in position.

Each of the chambers 2 is also provided with ports in its side walls through which fuel, such as gas or oil, can be introduced to the chambers 2 for the purpose of maintaining the molten metal therein at the required temperature. These ports are preferably inclined backward, as shown in Fig. 1, so that the burning fuel is directed toward the openings in the main tank 1.

30 indicates diagrammatically one arm of the glass machine which carries at its outer end a mold 31. In the position shown in Fig. 2 this mold has been brought over the delivery orifice 6 and lowered, by the lowering of the entire head of the glass machine, until its end is in engagement with the upper end of the delivery spout of the receptacle 3. The glass machine is preferably provided with a number of these arms, each carrying its own mold, which are brought in succession to the charging position over the delivery orifice 6 by any suitable mechanism actuated from the main power shaft of the machine; and this mechanism is so coördinated with that which rotates the cylinder 4 that the latter makes one complete revolution in each interval between successive mold movements. The two movements, that of the molds and that of the cylinder 4, are further so coördinated that the cylinder 4 is brought to the position indicated in Fig. 4 simultaneously with the lowering of any one mold into contact with the delivery orifice 6.

The operation of the above described apparatus is as follows: The parts having been brought to the position shown in Figs. 2 and 4, the valve 14 is opened by the action of the cam 16 thereby admitting compressed air from the reservoir 19 to the upper end of the hollow cylinder 4. This forces the glass contained in the cylinder out through the delivery orifice 6 and fills the mold 31. When the mold is filled, it is lifted away from the discharge orifice by the raising of the arm 30, and the excess of glass depending from the lowered end of the mold is cut off from the latter by means of a suitable knife, in the manner described in the Severin Patent No. 901,199 of October 13, 1908. The portion of glass so cut off, together with the following portions of the flow falls back into the chamber 2. When a sufficient amount has thus been discharged to wash off the end of the discharge spout the valve 14 is closed by the action of the cam 16 and the flow stops. By this time the continuous rotation of the cylinder 4 has closed the discharge port 6 and brought the port 7 into registry with the entry port 5, as shown in Fig. 3. The valve 15 is now opened by the action of the cam 17, thus placing the upper part of the hollow cylinder 4 in communication with the vacuum reservoir 23. This creates a suction in the cylinder 4 which draws in the glass through the entry port 5 and fills the interior of the cylinder to a height considerably above the level of the dominant pool. When a sufficient quantity of glass has been thus drawn into the cylinder the valve 15 is closed by the action of the cam 17.

While this filling operation is going on, the operation of the mold table actuating mechanism has carried a filled mold away from the charging position and brought another empty mold to that position ready for a repetition of the above described operations. The "overflow" of glass, which is discharged from the orifice 6 after the filling and removal of each mold, drops back into the chamber 2, but is prevented from mixing with the glass in the vicinity of the entry port 5 by the walls of the "floaters" 26 which compel this overflow glass to move backward into the main body of the tank. This backward movement is assisted by the action of the usual gas flames in the chambers 2 and by the action of the auxiliary flames which are directed to the tank through the ports 32 between the chambers. By the time this overflow has reached the rear openings between the floater walls 26 it has been thoroughly reheated and reamalgamated with the main body of glass in the tank thus eliminating all danger of producing chords or striæ in the body of material which is supplied to the inlet ports of the delivery receptacles.

The advantages of this apparatus over that disclosed in the earlier Severin patents are as follows:—

First:—The movement of the rotary valve which controls the admission of glass to the intermediate receptacles and its discharge therefrom into the mold is a continuous instead of an intermittent one. This permits of a much more rapid movement of the valve and a very decided increase in the speed of operation, so that from 12 to 15 molds can be charged per minute instead of only 6 to 8. The continuous movement of the valve in one direction also diminishes the liability of the valve to stick in position and consequently reduces the wear and the abrasion of the moving parts. The continuous movement of the valve surface over the stationary port also tends to reduce the tendency of the glass to chill and harden at the lower end of the delivery spout and thus produce a "lap" at that point in the delivered stream.

Second:—The use of a large pressure reservoir and a large suction or vacuum reservoir for the purpose of alternately applying pressure and suction to the surface of the glass in the delivery receptacle greatly simplifies the mechanism as compared with that described in the earlier Severin patents for the reason that it enables any number of delivery devices to be operated from a single set of reservoirs and a single set of pumps, the pressure and the suction used in each chamber being controlled independently by the valves 14 and 15 in any desired manner. The use of a large reservoir for the compressed air also permits of the heating of that air to a very high temperature, much higher than that at which it could be supplied to the discharge receptacle directly from the pump (as shown in the Severin Patent No. 984,974), and this in turn prevents any chilling of the upper surface of the glass in the delivery receptacles by this compressed air. The utilization of compressed air and vacuum tanks for the control of the pressure in the delivery chambers also enables that pressure to be regulated more exactly and maintained more nearly constant than is possible when a direct acting pump is employed for that purpose; and this in turn makes it possible to obtain a more uniform and steady flow of glass through both the inlet and the delivery ports. This arrangement also frees the pressure pump from undue heat.

Third:—The use of "floaters" prevents the overflow of glass from the delivery spout from passing directly backward to the vicinity of the entry port and producing chords or striæ in the molten metal which is drawn into the delivery chamber. This may be a very fruitful source of trouble in the use of such a form of apparatus as is shown in the earlier Severin Patents Nos. 901,199 and 984,974. With the arrangement described in the present application, the overflow glass is compelled to pass several feet backward into the main body of molten metal in the tank before it can again reach the opening which leads to the charging or entry ports of the intermediate receptacles. During this backward movement, ample time is given for the complete reheating of the "overflow" portions of the discharge, and for the complete and perfect re-amalgamation with the main body of molten material forming the dominant pool.

Other advantages of the hereinbefore described improvements will be readily appreciated by those skilled in the art, particularly by those who have had practical experience in the operation of the Severin apparatus.

For the sake of brevity in the claims, I have used the word "glass" because that substance is the one most commonly known as possessing the characteristics of material upon which my invention is applicable, but the use of that term is not to be understood as limiting the application of the invention to that substance but, instead, as defining that general class of materials which, in working conditions are thermoplastic as distinguished from thermoliquid.

I claim as my invention:

1. That improvement in the art of glass working, which comprises the maintenance of a dominant pool of molten glass, the intermittent segregation of comparatively small quantities thereof from a point below the surface of the pool, the ejection of a portion of each segregated quantity into a receptacle, the withdrawal of the filled receptacle, and the ejection of a subsequent portion of each segregated quantity to the dominant pool upon the surface thereof, and the guarding of the segregating point to a depth below the same and to a considerable distance toward the initial end of the dominant pool whereby the successive subsequently-ejected portions of molten glass which are returned to the dominant pool can not return to the segregating point for a considerable time.

2. That improvement in the art of glass working, which comprises the maintenance of a dominant pool of molten glass, the intermittent segregation of comparatively small quantities thereof from a point below the surface of the pool, the ejection of a portion of each segregated quantity into a receptacle, the withdrawal of the filled receptacle, and the ejection of a subsequent portion of each segregated quantity to the dominant pool, and the guarding of the segregating point to a depth below the same and to a considerable distance beyond the initial end of the dominating pool whereby the successive subsequently-ejected portions of molten glass which are returned to the dominant pool can not return to the segregating point for a considerable time.

3. That improvement in the art of glass working, which comprises the maintenance of a dominant pool of molten glass, the successive segregation of comparatively small quantities from the dominant pool at a point below the surface, the ejection of said segregated quantity by a heated gas applied directly thereto under pressure, a portion of said ejection being directed into a receptacle and a subsequent portion of said ejection returned to the dominant pool and the guarding of the segregation point to a point distant therefrom whereby the successively ejected quantities returned to the dominant pool can not return to the segregation point until after the lapse of considerable time.

4. That improvement in the art of glass working, which comprises a furnace for the maintenance of a dominant pool of molten glass, a segregating chamber arranged in said furnace and provided with an inlet port below the normal level of glass in the furnace and an outlet port above the normal level of glass in the furnace and in position to discharge either to an applied receptacle or to the dominant pool, means for alternating communication between the segregating chamber and the dominant pool through the inlet port and through the outlet port, and means for applying a heated gas under pressure within the segregating chamber to eject the glass therefrom through the discharge port, said last mentioned means comprising a reservoir, means for highly heating said reservoir and a pump for delivering gas under pressure to said reservoir.

5. That improvement in the art of glass working, which comprises a furnace for the maintenance of a dominant pool of molten glass, a segregating chamber arranged in said furnace and provided with an inlet port below the normal level of glass in the furnace and an outlet port above the normal level of glass in the furnace and in position to discharge either to an applied receptacle or to the dominant pool, means for alternating communication between the segregating chamber and the dominant pool through the inlet port and through the outlet port, and means for applying a heated gas under constant pressure within the segregating chamber to eject the glass therefrom through the discharge port.

6. That improvement in the art of glass working, which comprises a furnace for the maintenance of a dominant pool of molten glass, a delivery receptacle arranged in said furnace, to be partially submerged by the glass therein, said delivery receptacle comprising a main chamber, an entry port leading into said main chamber from a point below the normal level of glass in the furnace, and a discharge passage communicating with the main chamber and having its discharge end above the normal level of glass in the furnace, a rotary hollow valve mounted in said main chamber and provided with a port arranged to alternately connect the interior of said valve with the aforesaid entry port and discharge passage, means for rotating the said valve continuously, and means for injecting into said valve a heated gas under pressure when the port of said valve is in communication with the discharge passage, said last mentioned means comprising a reservoir, means for highly heating the interior thereof, and a pump for injecting gas under pressure into said reservoir, and means for exhausting the gas from the interior of the valve when the port thereof is in communication with the inlet port.

7. That improvement in the art of glass working, which comprises a furnace for the maintenance of a dominant pool of molten glass, a delivery receptacle arranged in said furnace, to be partially submerged in the glass therein, said delivery receptacle comprising a main chamber, an entry port leading into said main chamber from a point below the normal level of glass in the furnace, and a discharge passage communicating with the main chamber and having its discharge end above the normal level of a glass in the furnace, a rotary hollow valve mounted in said main chamber and provided with a port arranged to alternately connect the interior of said valve with the aforesaid entry port and discharge passage, means for rotating the said valve, and means for injecting into said valve a heated gas under pressure when the port of said valve is in communication with the discharge passage, said last-mentioned means comprising a reservoir, means for highly heating the interior thereof, and a pump for injecting gas under pressure into said reservoir, and means for exhausting gas from the interior of the valve when the port thereof is in communication with the inlet port.

8. That improvement in the art of glass working, which comprises a furnace for the maintenance of a dominant pool of molten glass, a delivery receptacle arranged in said furnace, to be partially submerged by the glass therein, said delivery receptacle comprising a main chamber, an entry port leading into said main chamber from a point below the normal level of glass in the furnace, and a discharge passage communicating with the main chamber and having its discharge end above the normal level of glass in the furnace, a rotary hollow valve mounted in said main chamber and provided with a port arranged to alternately connect the interior of said valve with the aforesaid entry port and discharge passage, means for rotating the said valve, and means for injecting into said valve a heated gas under pressure when the port of said valve is in communication with the discharge passage, said last mentioned means comprising a reservoir, means for highly heating the interior thereof, and a pump for injecting gas under pressure into said reservoir.

9. That improvement in the art of glass working, which comprises a furnace for the maintenance of a dominant pool of molten glass, a delivery receptacle arranged in said furnace, to be partially submerged by the glass therein, said delivery receptacle comprising a main chamber, an entry port leading into said main chamber from a point below the normal level of glass in the furnace, and a discharge passage communicating with the main chamber and having its discharge end above the normal level of glass in the furnace, a rotary hollow valve mounted in said main chamber and provided with a port arranged to alternately connect the interior of said valve with the aforesaid entry port and discharge passage, means for rotating the said valve continuously, and means for injecting into said valve a heated gas under pressure when the port of said valve is in communication with the discharge passage, said last mentioned means comprising a reservoir, means for highly heating the interior, and a pump for injecting gas under pressure into said reservoir.

In witness whereof, I have hereunto set my hand at Pittsburgh, Pennsylvania.

FRANK L. O. WADSWORTH.

Witness:
 SUE B. FRITZ.